May 6, 1958     J. PARNELL     2,833,988

THERMAL CONVERTER POWER MEASURING APPARATUS

Filed July 21, 1953     2 Sheets-Sheet 1

*INVENTOR.*
JOHN PARNELL
BY
ATTORNEY.

May 6, 1958 J. PARNELL 2,833,988
THERMAL CONVERTER POWER MEASURING APPARATUS
Filed July 21, 1953 2 Sheets-Sheet 2

INVENTOR.
JOHN PARNELL
BY
ATTORNEY.

United States Patent Office 2,833,988
Patented May 6, 1958

2,833,988

THERMAL CONVERTER POWER MEASURING APPARATUS

John Parnell, Ambler, Pa., assignor to Minneapolis-Honeywell Regulator Company, Minneapolis, Minn., a corporation of Delaware Application July 21, 1953, Serial No. 369,420

10 Claims. (Cl. 324—119)

A general object of the present invention is to provide an electrical measuring apparatus wherein an input electrical signal is converted into an output electrical signal in changed form by thermoelectric means. More specifically, the present invention is concerned with a thermal converter which is adapted for electrical power measuring circuits of the alternating current type where the converter is characterized by its ability to quickly produce an output control signal proportional to power changes and where that output signal will be free of the alternating current present in the power circuit.

The accurate and fast measurement of power consumed in alternating current circuits is required for efficient control and use of power generating stations, etc. Power measuring instruments must be rugged in order to operate under many different conditions, the instruments must be adapted for long life as they may be placed in positions where an attendant is not always present, and yet the instruments must be fast and accurate in indicating the power consumption. The thermal converter has long been used as a power measuring means. Some forms of early thermal converters were of the indirectly heated type wherein thermocouples were indirectly heated to indicate power consumption by an output direct current signal. Here the alternating current is isolated from the direct output current by separating the thermocouples from their heaters by thin insulations. When directly heated couples are used, the response speed is considerably increased but the use of the directly heated couple produces another problem in that alternating current is present in the direct current measuring circuit. The alternating current in the output of the thermal converters of the directly heated type may be eliminated by the conventional use of alternating current filters or by special circuitry of the type incorporated in the apparatus of the present invention.

It is accordingly a further more specific object of the present invention to provide a new and improved thermal converter of the directly heated thermal junction type wherein the alternating current from the power circuit is eliminated from the direct current measuring circuit.

Another more specific object of the present invention is to provide a thermal converter of the type wherein two separate thermal converter units are connected in series so that the alternating current present on the output of one of the units is opposed to the alternating current output of the other unit and the direct current outputs of said units add.

Still another more specific object of the present invention is to provide a thermal converter of the type wherein a thermocross is used wherein the thermocross is arranged so that it presents a high resistance to the input circuit and a low resistance to the output circuit.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Figure 1:
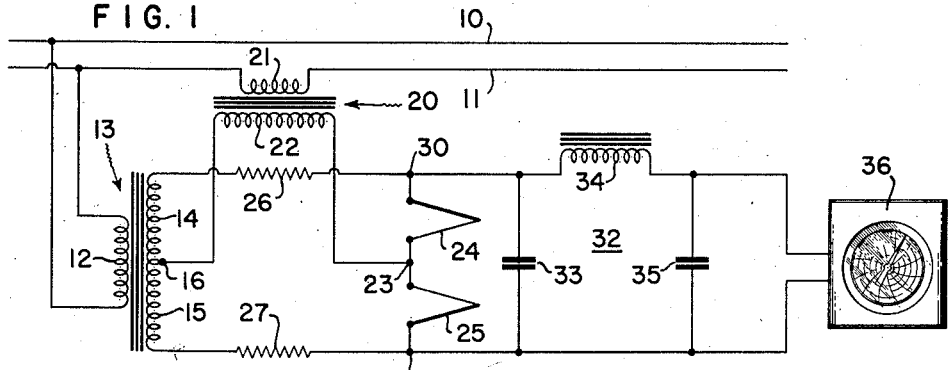
Fig. 1 is a diagrammatic showing of a thermal converter of conventional type.

Referring to Fig. 1, the numerals 10 and 11 represent a power line which is conducting power to some utilization device, not shown. A thermal converter of the prior art type is connected to the lines 10 and 11 for measuring the power output. This converter includes a primary winding 12 of the transformer 13 which is connected across the power lines 10 and 11. The transformer 13 additionally includes a secondary winding having an upper section 14 and a lower section 15 with a tap centered at 16. A current transformer 20 having a primary winding 21 connected in series with the power line 11 includes a secondary winding 22. One end of the secondary winding 22 is connected to the tap 16 of transformer 13 and to a junction 23 which is between a pair of thermocouple devices 24 and 25. A pair of resistors 26 and 27 are connected to the ends of the secondary winding of the transformer 13. The output terminals for the thermal converter are at 30 and 31 and connected to these output terminals is a filter 32 which comprises a condenser 33 which is connected across the output terminals 30 and 31, a choke 34, and a further bypass condenser 35. The output of the filter 32 is applied to the input of a suitable indicating and recording instrument 36 which may well be of the type disclosed in the patent to Walter P. Wills, No. 2,423,540, issued July 7, 1946.

The principle of operation of this conventional type thermal converter is based on the fact that the currents flowing through the thermocouples 24 and 25 will be representative of the power conditions existing on the lines 10 and 11. The currents in the couples 24 and 25 will be either indicative of the sum or difference of the currents originating from the transformers 13 and 20. Thus, if the phasing of the secondary of transformer 13 is such that the upper end is positive at the same instant that the left end of the secondary 22 is positive, the currents will flow through the thermocouples 24 and 25 such that the sum of the currents will be applied to the couple 24 and the difference of the currents will be applied to the thermocouple 25. This will be understood if a circuit is traced from the upper terminal of the secondary section 14 through resistor 26, thermocouple 24, thermocouple 25, resistor 27 back to the lower terminal of the secondary section 15. A similar circuit may be traced from the left end of the secondary 22 to the tap 16 where the current divides and one half goes upward through the section 14 to resistor 26 and thermocouple 24 back to the right end of the secondary 22 while the other half of the current flows through the lower section 15, through resistor 27, and thermocouple 25 back to the right hand terminal of the secondary 22. It will be noted that the current flow which comes from the secondary 22 flowing through thermocouple 24 will be additive with the current flowing from the secondary sections 14 and 15 while the other portion of the current flow from the secondary 22 flowing through the couple 25 will be in a direction opposite to the current originating from the secondary sections 14 and 15.

As each of the thermocouples 24 and 25 act as conventional ammeters in their respective circuits producing direct current outputs proportional to the heating action created by the currents flowing therein, there will be produced on the output terminals 30 and 31 a direct current voltage which is proportional to the power conditions existing on the lines 10 and 11. The direct current signal has superimposed thereon the alternating current signal originating from the secondary of transformer 13 since the secondary is effectively directly connected to the terminals 30 and 31. This alternating current may be eliminated by the filter 32 with the output of the filter being a direct current signal which is applied directly to the indicating and recording instrument 36.

The resistors 26 and 27 are present in the circuit to prevent the secondary sections 14 and 15 from acting as direct current short circuits for the output voltages of the thermocouples 24 and 25.

Figure 2:
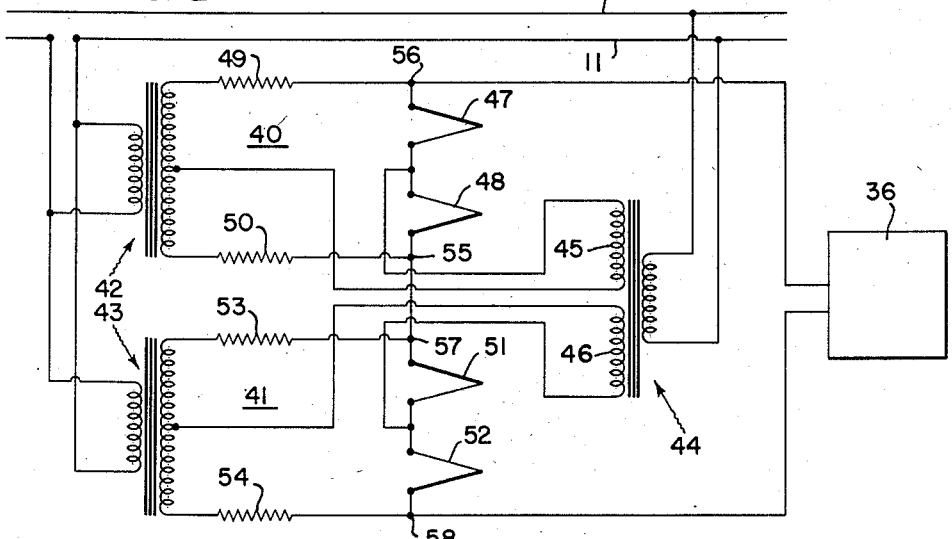
Fig. 2 shows the thermal converter of the present invention.

Referring now to Fig. 2, this figure shows a thermal converter circuit which eliminates the need for the filter which is used in the apparatus shown in Fig. 1. In this figure, the numerals 40 and 41 represent separate thermal converter circuits of the type shown in Fig. 1. These thermal converters are so connected that the alternating current present in the output of the thermal converter 40 is in opposition to the output of the thermal converter 41 while the direct currents produced by the couples associated therewith are connected to add. By having the circuits so connected that the alternating currents are in series opposition, the need for a filter on the output is eliminated.

More specifically, the apparatus of Fig. 2 includes a pair of current transformers 42 and 43, which may be combined, and a potential transformer 44 having a pair of secondary windings 45 and 46. The current transformer 42 and the secondary winding 45 of the potential transformer 44 provide the input signals for the thermal converter 40. The currents produced by the transformer 42 and the secondary 45 are arranged to differentially heat a pair of thermocouples 47 and 48. A pair of isolating resistors 49 and 50 are connected to prevent the direct current output of the couples 47 and 48 from being short circuited through the secondary of the current transformer 42.

The converter section 41 comprises a pair of directly heated thermocouples 51 and 52 which are arranged to be differentially heated by the secondary 46 and the secondary of the transformer 43. A pair of resistors 53 and 54 serve to prevent the short circuiting of the output of the couples 51 and 52 through the secondary of the transformer 43.

Each of the thermal converter sections 40 and 41 function in the same manner as the basic converter section shown in Fig. 1. The converter sections 40 will produce at terminals 55 and 56 a direct current voltage proportional to the potential and current conditions existing on the power lines 10 and 11. Likewise, the converter section 41 will be producing an output voltage on terminals 57 and 58 with this voltage likewise being proportional to the potential and current conditions existing on the lines 10 and 11. The output for this configuration is on terminals 56 and 58 and is connected to a suitable indicating instrument 36. This output circuit will be seen to include the potentials originated from the thermocouples 47, 48, 51, and 52 with the voltages of the thermocouples being added in series. It will be noted that the terminals 55 and 56 will have an alternating current thereon which is originating from the secondary of transformer 42. There may also be an alternating current on terminals 55 and 56 due to an unbalance condition created by the difference in resistances of the thermocouples 47 and 48 caused by the differential heating of the couples. This causes a signal to appear from the secondary 45 since the junction between the couples 47 and 48 will not remain electrically centered with respect to the tap on the secondary of transformer 42. Likewise, the terminals 57 and 58 will have an alternating current thereon which is originating from the secondary of the transformer 43 and from the resistance unbalance between the thermocouples 51 and 52 and the secondary 46. In order to eliminate this alternating current from the output terminals 56 and 58, it is necessary to reverse the phasing of the secondary of transformer 42 with respect to the secondary of transformer 43 so that the alternating signals will be 180° out of phase and will therefore cancel. Further, it is necessary to reverse the phasings of the secondary 45 with respect to the winding 46. Such reversal will eliminate the unbalance due to the resistance changes resulting from the heating of the thermocouples. In this way, the only signal which the instrument 36 will see will be the direct current signals originating from the thermocouples 47, 48, 51, and 52.

Figure 3:
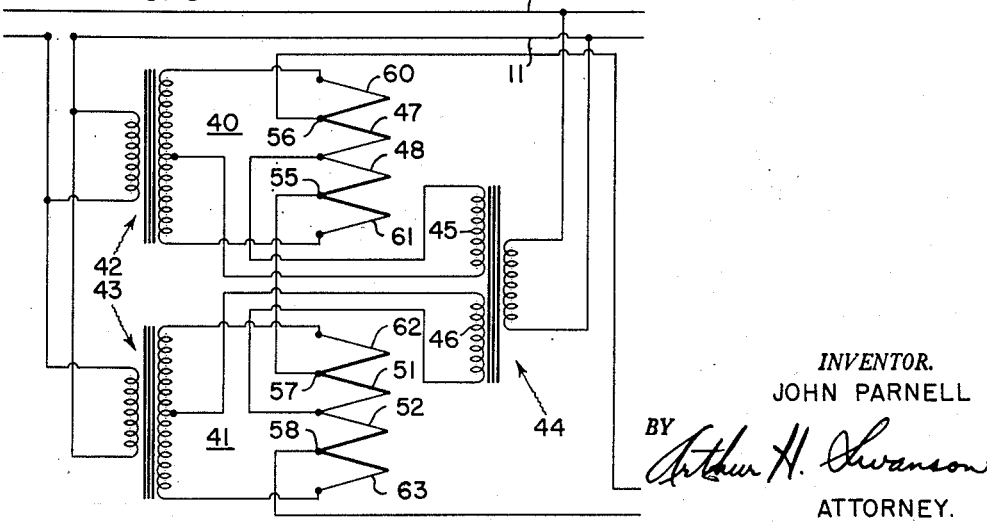
Fig. 3 shows a modified form of the thermal converter shown in Fig. 2.

Fig. 3 is a slightly modified form of the apparatus shown in Fig. 2 with the modification being directed principally to the addition of extra thermocouples to prevent the short circuiting of the thermocouple outputs by the transformer secondaries. Corresponding components in the two arrangements carry corresponding reference numerals. Newly added in the present figure are thermocouples 60 and 61 in the section 40 and the thermocouples 62 and 63 in the thermal converter section 41.

The basic operation of the apparatus of Fig. 3 is the same as that of Fig. 2 with the thermal converter section 40 and the thermal converter section 41 having their outputs effectively added in series with the output terminals again being at terminals 56 and 58. Again, the alternating currents appearing on the terminals 56 and 55 are arranged to be 180° out of phase with the alternating current appearing on the terminals 57 and 58 so that between the terminals 56 and 58 there will be no alternating current signal present. The thermocouples 60 and 61 in the thermal converter section 40 serve to prevent the short circuiting of the thermocouples 47 and 48 by the secondary of the transformer 42. This is accomplished by connecting the thermocoupler 60 so that its output voltage is opposed to the output voltage of the thermocouple 47 in a circuit that may be traced from the thermocouple 60 through the upper half of the secondary of transformer 42 through the secondary 45 back to the junction between the thermocouples 47 and 48. In other words, the thermocouple 60 is effectively electrically in parallel with the thermocouple 47 and prevents the loading of the thermocouple 47 by the short circuiting effects of the last traced circuit. The thermocouple 61 is also effectively in parallel with the thermocouple 48 so that there is no effective short circuiting of the output of the couple 48.

In the thermal converter section 41, the thermocouples 62 and 63 function in exactly the same manner as that set forth with respect to the couples 60 and 61 in the thermal converter section 40.

Figure 4:
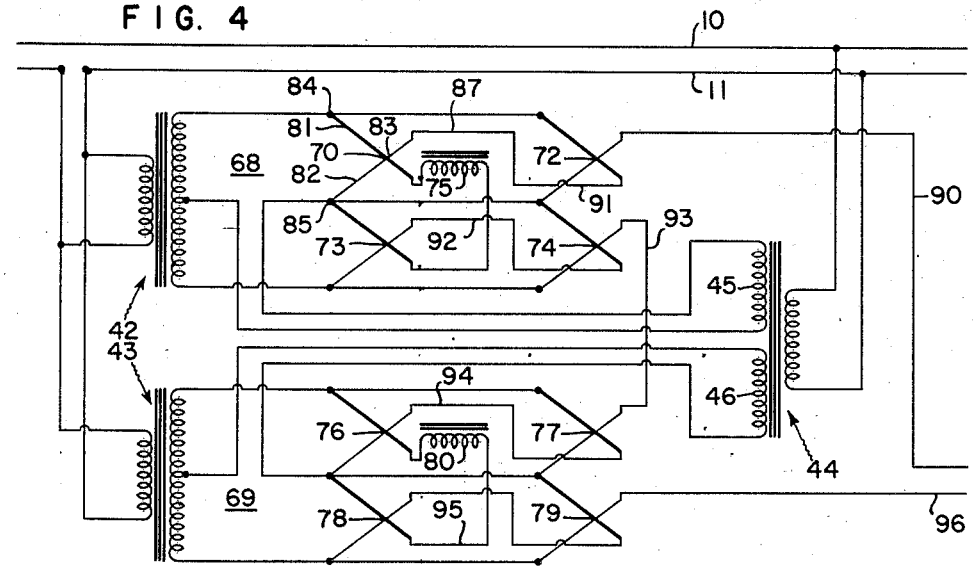
Fig. 4 shows a form of thermal converter using thermocrosses as the measuring element.

Fig. 4 is a form of the apparatus wherein a thermocross is used to provide the output direct current signal indicative of the power conditions on the power lines 10 and 11. The potential transformers used in Figs. 2 and 3 may likewise be used in the apparatus of Fig. 4. In the present figure there are provided two thermal converter sections 68 and 69. The converter section 68 comprises a plurality of thermocrosses 70, 72, 73, and 74. Also included is a choke 75. The thermal converter section 69 comprises a plurality of thermocrosses 76, 77, 78, and 79. A choke 80 is also included in this thermal converter section.

Each of the thermocrosses in the present figure comprises a pair of crossed dissimilar wires with their points of junction being at a point which is near the ends thereof.

Considering the thermocross 70 as being representative of the other thermocrosses of the apparatus, this cross may comprise a "Chromel" wire 81 which is crossed with a constantan wire 82 at a junction point 83. The junction point of this thermocross is near the ends of the wires 81 and 82. The reason for this displaced junction point is that it is desired that the input resistance to the thermocross be relatively high compared to the output resistance. In other words, between terminals 84 and 85, where the power indicating currents are applied, the resistance is high. The resistance between connecting lead 87 and the left terminal of the choke 75 through the junction 83 is relatively low. This arrangement tends to prevent the shunting of the output of the thermocrosses by the input circuit and provide a low resistance circuit for the direct current output of the thermocrosses. Each of the other thermocrosses is arranged in a manner similar to that of the thermocross 70.

The heating of the thermocrosses of the thermal converter sections 68 and 69 are basically the same with the sections 40 and 41 of the apparatus shown in Figs. 2 and 3. It will be noted that the thermocrosses 70 and 72 are effectively connected in parallel with each other as far as the input circuit is concerned. The same is true of the thermocrosses 73 and 74. In the thermal converter section 69 the thermocrosses 76 and 77 are effectively connected in parallel as far as the input is concerned and the thermocrosses 78 and 79 are connected in parallel. The outputs of these thermocrosses are all connected in series so that the direct currents thereof will be additive. This series output circuit may be traced from the output lead 90 through the thermocross 72 to conductor 91, thermocross 70, choke 75, thermocross 73, conductor 92, thermocross 74, conductor 93, thermocross 77, conductor 94, thermocross 76, choke 80, thermocross 78, conductor 95, and thermocross 79, to the output conductor 96.

In order to prevent a shunting effect of the alternating input current flow in this direct current series circuit, the chokes 75 and 80 are provided. These chokes provide a low resistance direct current connection between the upper and lower portions of each section and a high impedance to the alternating current between these sections.

Figure 5:
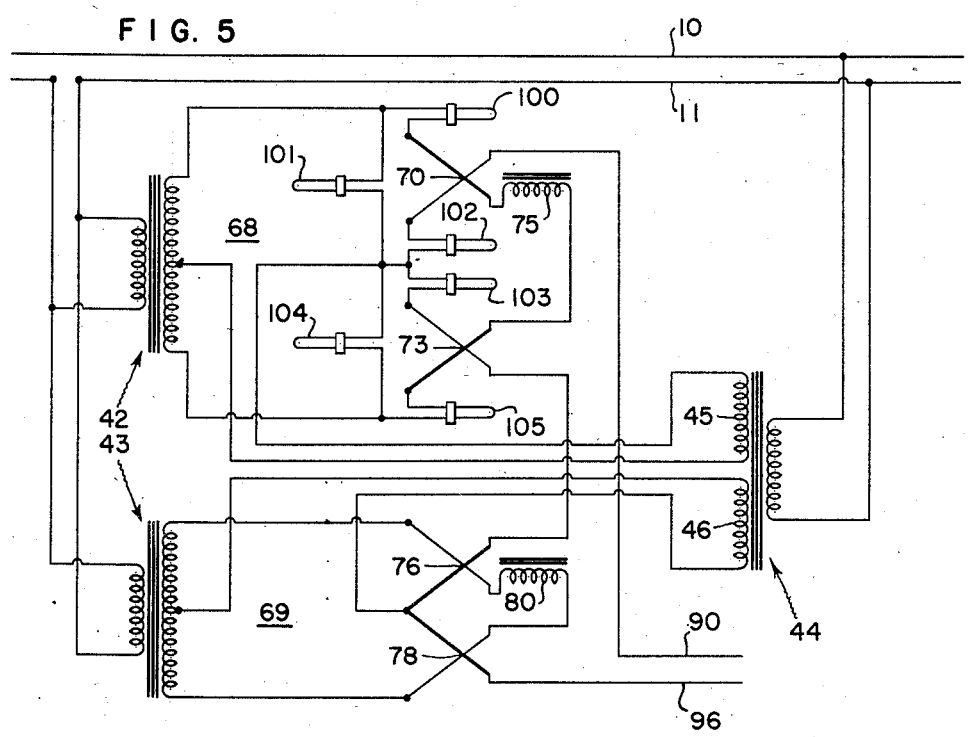
Fig. 5 shows one manner in which calibration and balancing may be effected.

The apparatus of Fig. 5 shows one manner in which apparatus of the present type may be balanced so as to correct for circuit differences in components which are intended, when built, to be identical. While the figure shows thermocross used in the apparatus, it will be understood that the directly heated thermocouple may also be used in the configuration shown. Corresponding components between Figs. 4 and 5 carry corresponding reference numerals. In the present figure, only two thermocrosses are shown in each of the thermal converter sections in order to simplify the explanation and the drawing. It will be understood, however, that more thermocrosses or thermocouples may be substituted in the arrangement.

Added to the present figure are adjustable resistance elements 100, 101, 102, 103, 104, and 105. Each of these adjustable resistance elements comprises a loop of wire with an adjustable shorting bar although other suitable adjustable resistors may be used.

The overall operation of the apparatus of Fig. 5 will be the same as that of Fig. 4 once the apparatus has been properly balanced by the adjustable resistors in the section 68.

The adjusting procedure for the apparatus will be understood upon considering the following. The first step is to energize only the potential transformer 44 and with the transformer energized, the adjustable resistors 100 and 102 should have their shorting bars adjusted in the same direction until there is a direct current balance on the output leads 90 and 96. The next step is the eleminating of the alternating current present on the output leads 90 and 96 and this is accomplished by alternate movement of the shorting bars of the resistors 100 and 102. In other words, as the shorting bar of the resistor 100 is moved to the right, the shorting bar of the resistor 102 must be moved a corresponding distance to the left. By adjusting it in this manner, the direct current balance which was obtained in the first step will not be disturbed.

The third step in the adjusting procedure is to de-energize the potential transformer 44 and energize the current transformers 42 and 43. With the current transformers energized, the shorting bar on the resistor 101 is adjusted until there is a direct current balance. The fourth step of the adjustment is keeping the current transformers on and then adjusting for an alternating current balance on the output leads 90 and 96. This is accomplished by moving the shorting bars of the resistors 100 and 102 together as well as the shorting bars of the resistors 103 and 105. By movement together, the shorting bars should be moved in the same direction.

As the adjustments are so arranged that there may be an upsetting of an adjustment by the making of a later adjustment, it is necessary to repeat the foregoing steps until such time as there is both a direct current balance with either one or the other of the transformers energized and the alternating current is eliminated when the potential and current transformers are both energized. It will be obvious that this adjusting method is only one of many ways in which apparatus of the present type may be adjusted but the important thing is that the alternating current be eliminated from the output terminals 90 and 96 and that these output terminals not have any direct current output when either the current or the potential signals are not applied into the apparatus.

While, in accordance with the provisions of the statutes, there has been illustrated and described the best forms of the embodiments of the invention known, it will be apparent to those skilled in the art that changes may be made in the form of the apparatus disclosed without departing from the spirit of the invention as set forth in the appended claims and that in certain cases, certain features of the invention may be used to advantage without a corresponding use of other features.

Having now described my invention, what I claim as new and desire to secure by Letters Patent is:

1. A thermal converter for converting an alternating power signal into a proportional direct current signal, the combination comprising, a first thermocouple unit comprising at least one pair of differentially connected thermocouples arranged to be energized by the sum and difference currents of signals representative of alternating voltage and current and having a direct current output with an alternating signal superimposed thereon, a second thermocouple unit comprising at least one pair of differentially connected thermocouples arranged to be energized by the sum and difference currents of signals representative of alternating voltage and current and having a direct current output with an alternating current superimposed thereon which is of opposite phase to the alternating current superimposed on the direct current output of said first unit, and circuit means connecting the outputs of said first and second units in direct current additive relation and alternating current opposing relation so that the output signal will be only a direct current signal proportional to power.

2. An alternating current power to direct current converter comprising, a first thermocouple unit including a pair of differentially connected thermocouples connected to sources so as to be directly energized by currents representative of the current on and voltage across an alternating current source, to heat one of said thermocouples in accordance with the sum of said current and voltage currents and the other of said thermocouples in accordance with the difference of said current and voltage currents, said first unit having a direct current output taken from said differentially connected thermocouples with an alternating current signal superimposed thereon, a second thermocouple unit comprised as said first unit with a direct current output and an alternating signal superimposed thereon whose alternating current phasing with respect to that on said first unit output is reversed, and circuit means connecting the differentially connected thermocouples of both of said units in series so that the direct current outputs will be added and the superimposed alternating signals will be subtracted.

3. In apparatus of the class described, the combination comprising, a first transformer having a center tapped secondary, a first pair of thermocouples connected in series to the end terminals of said secondary, a second transformer having a secondary winding, means connecting the secondary of said second transformer between the center tap of said first transformer secondary and the junction of said pair of thermocouples, said thermocouples when so connected having a direct current output with an alternating signal theron originating from said secondary of said first transformer, a third transformer having a center tapped secondary, a second pair of thermocouples connected in series with the ends of said third transformer secondary, a fourth transformer having a secondary connected between the tap of said third transformer secondary and the junction of said second pair of thermocouples, the last mentioned thermocouples when so connected having a direct current output with an alternating signal thereon originating from said secondary of said third transformer, means connecting said first and second pairs of thermocouples in series so that the direct current outputs are added, and means connecting said first and third transformers to a common source of potential so that with the connections to said first and second pairs of thermocouples the phasing of the alternating signals will be opposed when said first and second pairs of thermocouples are connected in series to cancel the alternating signals and produce only a direct current signal proportional to power.

4. A thermal converter for converting an alternating power signal into a proportional direct current signal, the combination comprising, a first thermocouple unit comprising at least one pair of differentially connected thermocouples arranged to be energized by the sum and difference currents of signals representative of alternating voltage and current and having a direct current output with an alternating signal superimposed thereon, a second thermocouple unit comprising at least one pair of differentially connected thermocouples arranged to be energized by the sum and difference currents of signals representative of alternating voltage and current and having a direct current output with an alternating current superimposed thereon of opposite phase to the alternating current superimposed on the output of said first unit, and circuit means connecting the differentially connected thermocouples of both of said units in series with the alternating signal cancelling and the direct current outputs adding.

5. A thermal converter comprising, a pair of series connected thermocouple units connected in direct current additive relation and alternating current cancelling relation, each of said units comprising a center tapped secondary winding energized by one component of said power signal, a pair of series connected thermocouples connected to the ends of said tapped secondary winding, and a second secondary winding energized with the other component of said power signal connected to the tap of said center tapped secondary winding and the junction of said thermocouples to energize one of said thermocouples in accordance with the sum of said components and the other of said thermocouples in accordance with the differences in said components, the thermocouples of both of said units being connected in series, and output connections on the ends of said series connected thermocouples 6. A thermal converter for producing a direct current signal proportional to an electric power signal which is being measured comprising, a pair of separate thermocouple units each arranged to be heated by the sum and difference currents of a pair of power measuring signals to produce a proportional direct current signal and having an alternating current signal on the output thereof, wherein each of said thermocouple units comprises a pair of thermocrosses connected in series across a first transformer energized by one component of a power signal, and second transformer connected between the junction of said thermocrosses and a tap on said first transformer with the direct current output of said thermocrosses being added in series, and means connecting said units in series so that the alternating current signals will be in opposition and the output direct currents of said units will add.

7. A thermal converter for producing a direct current signal proportional to an electric power signal which is being measured comprising, a pair of separate thermocouple units each arranged to be heated by the sum and difference currents of a pair of power measuring signals to produce a proportional direct current signal and having an alternating current signal on the output thereof, wherein each of said thermocouple units comprises a pair of thermocrosses connected in a series circuit across the ends of a transformer energized by one component of a power signal, said thermocrosses each comprising a pair of dissimilar metals engaging each other at a point near their ends with the longest path through the thermocross being in said series circuit, a second transformer connected between the junction of said thermocrosses and a tap on said first transformer, and a direct current output connection from said thermocrosses taken from the shortest path through said thermocrosses, and means connecting said units in series so that the alternating current signals will be in opposition and the output direct currents of said units will add.

8. In apparatus of the class described, the combination comprising, a first center tapped transformer secondary, a first pair of thermocouples connected in series to the end terminals of said first center tapped secondary, a first pair of resistors in said last named series connection, a second transformer having two secondaries, means connecting one of said two secondaries of said second transformer between the center tap of said first center tapped transformer secondary and the junction of said pair of thermocouples, said thermocouples when so connected having a direct current output signal with an alternating signal superimposed thereon originating from said first center tapped transformer secondary, a second center tapped transformer secondary, a second pair of thermocouples connected in series with the end terminals of said second center tapped transformer secondary, a second pair of resistors in said last named series connection, means connecting the second secondary of said second transformer between the center tap of said second center tapped transformer secondary and the junction of said second pair of thermocouples, said thermocouples when so connected having a direct current output signal with an alternating signal superimposed thereon originating from said second center tapped transformer secondary, means connecting said first and second pair of thermocouples in series so that the direct current outputs are added, and means connecting said first and second center tapped transformer secondaries to a common signal source in such manner that the alternating signals in said first and second pair of thermocouples are opposed and effectively cancel out leaving only said direct current output signals.

9. In apparatus of the class described, the combination comprising, a first center tapped transformer secondary, a first pair of thermocouples connected in series to the end terminals of said first center tapped transformer secondary, a first pair of direct potential sources connected in said last named series connection to oppose the flow of direct current in said connection, a second transformer secondary, means connecting said second secondary between the center tap of said first center tapped transformer secondary and the junction of said first pair of thermocouples, said thermocouples when so connected having a direct current output signal with an alternating signal superimposed thereon originating from said secondary of said first center tapped transformer secondary, a third center tapped transformer secondary, a second pair of thermocouples connected in series with the ends of said third center tapped transformer secondary, a second pair of direct potential sources connected in said last named series connection to oppose the flow of direct current in said connection, a fourth transformer secondary connected between the center tap of said third center tapped transformer secondary and the junction of said second pair of thermocouples, said thermocouples when so connected having a direct current output signal with an alternating signal superimposed thereon originating from said second center tapped transformer secondary, means connecting said first and second pair of thermocouples in series so that their direct current outputs are added, means connecting said first and third center tapped transformer secondaries to a common source of potential in such a manner that, with the connections to said first and second pair of thermocouples, the phasing of the alternating signals are opposed and effectively cancel out leaving only said direct current output signal, and means connecting the second and fourth transformer secondaries so that their phasings are reversed.

10. In apparatus of the class described, the combination comprising, a first center tapped transformer secondary, a first pair of thermocouples connected in series to the end terminals of said secondary, a second pair of thermocouples connected in said last named series connection to oppose the flow of direct current in said connection, a second transformer secondary, means connecting said second secondary between the center tap of said first center tapped transformer secondary and the junction of said first pair of thermocouples, said first thermocouples when so connected having a direct current signal output with an alternating signal superimposed thereon originating from said center tapped transformer secondary, a third center tapped transformer secondary, a third pair of thermocouples connected in series with the end terminals of said third center tapped secondary, a fourth pair of thermocouples connected in said last named series connection to oppose the flow of direct current in said connection, a fourth transformer secondary connected between the center tap of said third center tapped transformer secondary and the junction of said third pair of thermocouples, said third pair of thermocouples when so connected having a direct current output signal with an alternating signal superimposed thereon originating from said fourth transformer secondary, means connecting said first and third pair of thermocouples in series so that the direct current output signals are added, and means connecting said first and third center tapped transformer secondaries to a common source of potential so that with the connections to said first and third pair of thermocouples the phasing of the alternating signals are opposed and effectively cancel out leaving only said direct current signals.

References Cited in the file of this patent

UNITED STATES PATENTS

| 1,934,595 | Fischer | Nov. 7, 1933 |
| 2,059,594 | Massa | Nov. 3, 1936 |
| 2,278,686 | Brown et al. | Apr. 7, 1942 |
| 2,278,687 | Brown et al. | Apr. 7, 1942 |
| 2,283,566 | Miller | May 19, 1942 |
| 2,301,612 | Brown | Nov. 10, 1942 |
| 2,577,111 | Downing et al. | Dec. 4, 1951 |
| 2,682,614 | Lenehan | June 29, 1954 |

OTHER REFERENCES

"A Thermal Converter for Telemetering and Totalizing," William C. Downings, Jr., A. I. E. E., Technical Paper No. 49–159, 321–1.5.